US011921699B1

(12) United States Patent
Govindagowda et al.

(10) Patent No.: US 11,921,699 B1
(45) Date of Patent: Mar. 5, 2024

(54) LEASE-BASED CONSISTENCY MANAGEMENT FOR HANDLING FAILOVER IN A DATABASE

(71) Applicant: Amazon Technologies, Inc., Seattle, WA (US)

(72) Inventors: Upendra Govindagowda, Renton, WA (US); Anand Kumar Thakur, Snohomish, WA (US); David Charles Wein, Shoreline, WA (US); Alexandre Olegovich Verbitski, Woodinville, WA (US); James C Nasby, Austin, TX (US); Hong Yang, Kirkland, WA (US); Gaurav Kumar Gupta, Waterloo (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/067,676

(22) Filed: Dec. 16, 2022

(51) Int. Cl.
| | |
|---|---|
| *G06F 16/00* | (2019.01) |
| *G06F 16/11* | (2019.01) |
| *G06F 16/21* | (2019.01) |
| *G06F 16/23* | (2019.01) |
| *G06F 16/27* | (2019.01) |
| *G06F 11/20* | (2006.01) |

(52) U.S. Cl.
CPC .......... *G06F 16/2365* (2019.01); *G06F 16/11* (2019.01); *G06F 16/219* (2019.01); *G06F 16/2322* (2019.01); *G06F 16/27* (2019.01); *G06F 11/2023* (2013.01); *G06F 2201/84* (2013.01)

(58) Field of Classification Search
CPC .... G06F 16/11; G06F 16/219; G06F 16/2322; G06F 16/2365; G06F 16/27; G06F 11/2023; G06F 2201/84
See application file for complete search history.

(56) References Cited

U.S. PATENT DOCUMENTS

| | | | |
|---|---|---|---|
| 9,576,038 B1* | 2/2017 | Huang | G06F 16/27 |
| 11,138,180 B2 | 10/2021 | Chang et al. | |
| 11,762,846 B1* | 9/2023 | Atherton | H04L 9/0643 |
| | | | 713/193 |
| 2012/0310991 A1* | 12/2012 | Frantz | G06F 16/278 |
| | | | 707/E17.011 |
| 2015/0341467 A1* | 11/2015 | Lim | H04L 69/16 |
| | | | 709/203 |
| 2016/0179865 A1* | 6/2016 | Bortnikov | G06F 9/52 |
| | | | 707/704 |
| 2018/0150364 A1* | 5/2018 | Parakh | G06F 12/0868 |
| 2018/0322158 A1* | 11/2018 | Zhang | G06F 16/2343 |
| 2019/0340276 A1* | 11/2019 | Thomsen | G06F 16/2343 |
| 2020/0127861 A1 | 4/2020 | Doshi et al. | |
| 2020/0252404 A1 | 8/2020 | Padmanabhan | |
| 2022/0092050 A1* | 3/2022 | Luo | G06F 16/2379 |

* cited by examiner

*Primary Examiner* — Diedra McQuitery
(74) *Attorney, Agent, or Firm* — S. Scott Foster; Kowert, Hood, Munyon, Rankin & Goetzel, P.C.

(57) ABSTRACT

Lease-based consistency may be implemented for databases to handle failovers. A database node may obtain a consistency lease that describes a point in time determined from a time-to-live amount added to a consistent point in time for database data. While the consistency lease is valid, Multi-version Concurrency Control (MVCC) snapshots assigned by the database node can be used to handle requests to access the database data. Once expired, the database node may have to renew the consistency lease in order to continue to handle write and read requests.

20 Claims, 12 Drawing Sheets

LEASE-BASED CONSISTENCY MANAGEMENT FOR HANDLING FAILOVER IN A DATABASE

BACKGROUND

Commoditization of computer hardware and software components has led to the rise of service providers that provide computational and storage capacity as a service. At least some of these services (e.g., managed services such as managed relational database services) may be distributed in order to scale the processing capacity of the service and increase service availability. Because distributed systems may be disrupted due network and other failure scenarios, resiliency to handle these various failure scenarios may be implemented to prevent disruption of client systems or applications that utilize these services.

Figure 1:
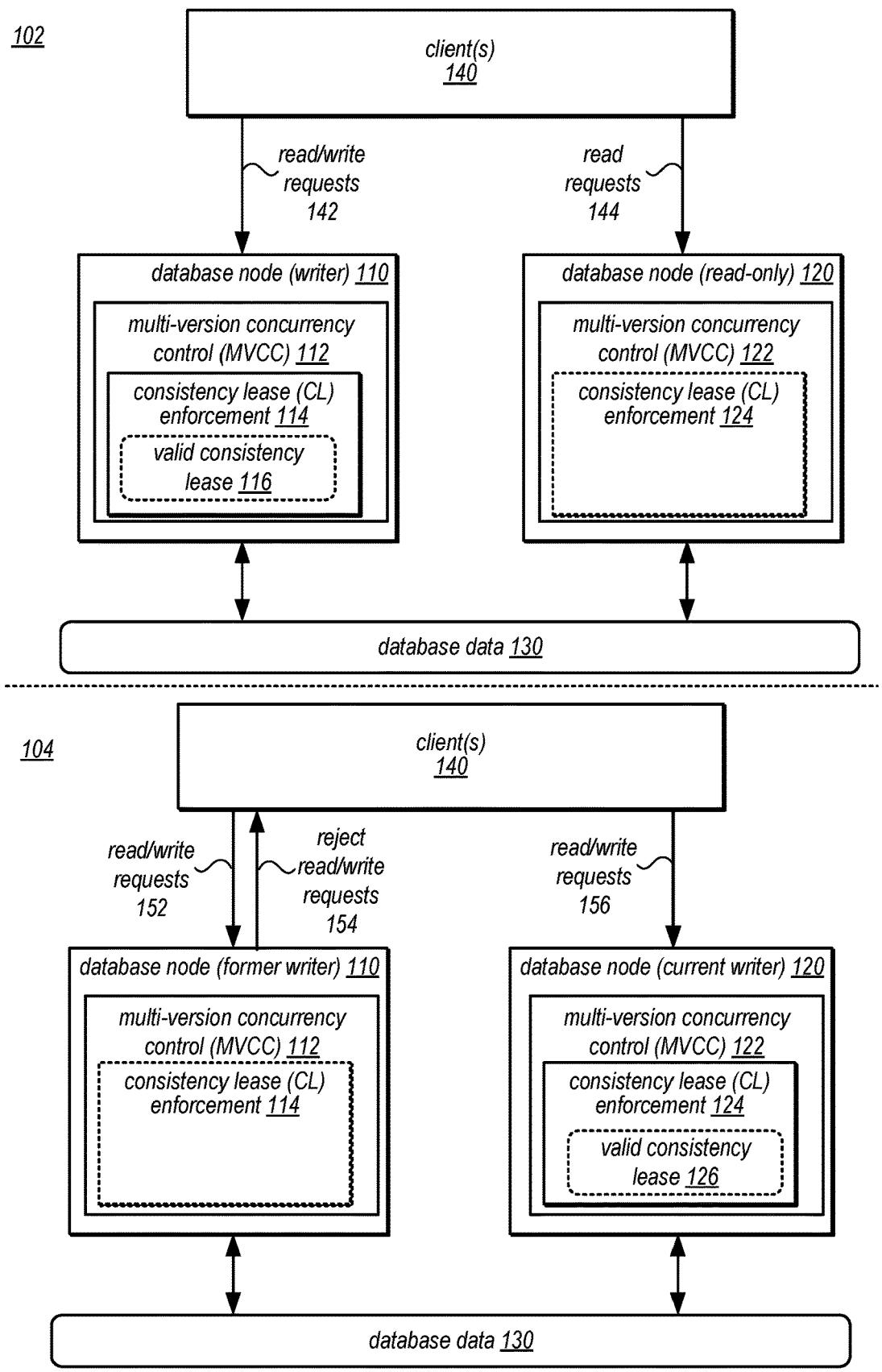
FIG. 1 is a logical block diagram illustrating lease-based consistency management for handling failover in a database, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Techniques for lease-based consistency management for handling failover in a database are described herein. Distributed database systems may be implemented in various embodiments to provide for a high performance capacity and high availability for handling client application workloads. Multiple database engines, management systems, query engines or other database nodes as discussed below may provide different components for providing access to a database. To ensure that consistent access is maintained, one of the database nodes may be a writer, while other database nodes may be read-only nodes.

Because failures in a distributed system, like a distributed database system, may occur because of network or other failures that are not necessarily perceptible at each database node or other component of the distributed database system at the same time, in various embodiments, failovers that change the properties of a database node (e.g., changing from a read-only node to a writer node (that also performs reads), or from a writer node to a read-only node) can be independently determined at each database node without communicating with other database nodes using consistency leases, as discussed in detail below with regard to FIGS. 1-11.

Independent reasoning at database nodes in order to ensure consistency when accessing the database may avoid different problematic behaviors that would violate consistency. For example, domain name service (DNS) records may be maintained at client applications that identify the network address of database node that handles certain request types, such as a writer node. If a writer node were to no longer be the writer node for a database (thus becoming a former writer), the DNS records on client applications could still identify the former writer as a current writer. If the former writer were unable to detect that failover has occurred and no longer act as the writer when handling access requests (e.g., read or write requests), then the former writer might act on or provide stale data of the database which may have been modified by a current writer.

Such problematic scenarios can grow more complex in scenarios where data is also distributed in addition to the database nodes that provide access to the data. For example, inconsistent reads of data could occur in a scenario with multiple clients and database nodes and multiple partitions of database data. Consider a scenario where two clients (e.g., either database application clients, or routers as discussed below with regard to FIGS. 2-7) that are accessing database nodes responsible for different partitions (or shards as discussed below). In this scenario, client 1 may have a connection to the correct database node for writing to shard 1 and have a stale connection to a former writer for shard 2 due to stale DNS records. The database node that is a former writer for shard 2 may have not restarted or realized that it is now a read-only node (e.g., due to a network partition), and thus may still attempt to act as the current writer to shard 2. In this scenario, client 2 may have correct connections to the current database nodes that are writers for shard 1 and shard 2. A transaction (T1) that transfers data from row 1 in shard 1 to row 2 in shard 2 may be performed at client 2. If a snapshot read of row 1 and row 2 is performed by client 1, an inconsistent read could occur because of a stale read from shard 2's former writer is not aware of T1.

Consistency leases, as discussed in detail below, may avoid such problematic scenarios, allowing each database node (and ultimately a client) to detect and determine when failovers have occurred so that the database node handling a particular access request does so in a manner that corresponds to its current role (e.g., current writer, former writer, read-only, etc.).

FIG. 1 is a logical block diagram illustrating lease-based consistency management for handling failover in a database, according to some embodiments. In scene 102, multiple client(s) 140 (which may be client applications of a database system or service, or routers, as discussed below with regard to FIGS. 2-7 or other components that act as clients of database nodes that provide access to a portion (or all) of a database. Database node 110 may provide access to database data 130 as a writer (as well as read access). Database node 120 may provide access to database data 130 as a read-only node. Both database nodes 110 and 120 may implement multi-version concurrency control (MVCC) 112 and 122 respectively, which may provide consistent access for reads and writes to database data 130 concurrently using snapshot isolation. Snapshot isolation may provide a consistent point in time view of a database according to a snapshot of the database data 130 at a point in time identified by database nodes 110 and 120. Various techniques for assigning snapshot times may be implemented, including using timestamps. In some embodiments, to avoid clock skew or divergence between database nodes, a time synchronization service, such as time synchronization service 240 as discussed in detail below with regard to FIG. 2 may be implemented to ensure that time (and thus timestamps) are accurate at both database nodes 110 and 120 (e.g., within a margin of error). A time sync agent implement on database nodes (not illustrated) may be able to obtain synchronized time values using the time synchronization service 240 and thus the various times used for consistency lease enforcement, writes, or other interactions may be based on synchronized times.

MVCC concurrency control 112 and 122 may implement consistency lease (CL) enforcement (as indicated at 114 and 124) in various embodiments. As discussed in detail below, consistency leases may be obtained or renewed based on requests to write database data 130. If a valid consistency lease is held by a database node, as indicated at 116 at database node 110, then that database node may be confirmed as the sole authorized writer to database data 130, and provide snapshot isolation for handling read and write requests, including those that may be included in a group of one or more actions in a transaction. Thus, as depicted in scene 102, client(s) 140 may submit read and write requests 142 to database node 110 and read requests 144 (which may be a read-only node in some embodiments, or a stand-by node in other embodiments). For embodiments where database node 120 accepts read requests 144 as a read-only node, further techniques to provide MVCC (that do not necessarily utilize consistency lease enforcement 124, which is indicated with a dotted line for a read-only role) may be implemented to ensure that writes performed by database node 110 are exposed (or not exposed) according to a MVCC snapshot point in time assigned to the read requests 144.

Scene 104 illustrates a failover scenario, where database node 110 has become a former writer and database node 120 has become the current writer 120. As discussed below with regard to FIGS. 8-11, failover events may occur for various reasons. Database node 120 may have successfully obtained a valid consistency lease 126 and thus may begin to accept and perform read/write requests 156 (although a wait period may be enforced as discussed below with regard to FIGS. 9 and 11). Database node 110 may be able to independently discover that is no longer the current writer (e.g., by receiving a write request or otherwise making an attempt to obtain a valid consistency lease after expiration of lease 116). Because MVCC 112 may not allow performance of access requests without a valid consistency lease (at least when acting as a writer node), then as indicated at 154, read and write requests (received at 152) may be rejected. In some embodiments, database node 110 may restart or convert to a read-only node (or may act as a standby that does not actively handle requests). Again, a read-only node may not necessarily utilize consistency lease enforcement 114, and thus it is a dotted line in scene 104.

Please note, FIG. 1 is provided as a logical illustration of database nodes, clients, and a database, and is not intended to be limiting as to the physical arrangement, size, or number of components, modules, or devices to implement such features.

The specification continues with a description of an example network-based database service that supports both a client-managed table and system-managed table in a common database for which lease-based consistency management for handling failover may be implemented. Included in the description of the example network-based database service are various aspects of the example network-based database service, such as a database node, router, metadata service, control plane, and a storage service. The specification then describes flowcharts of various embodiments of methods for implementing lease-based consistency management for handling failover in a database. Next, the specification describes an example system that may implement the disclosed techniques. Various examples are provided throughout the specification.

Figure 2:
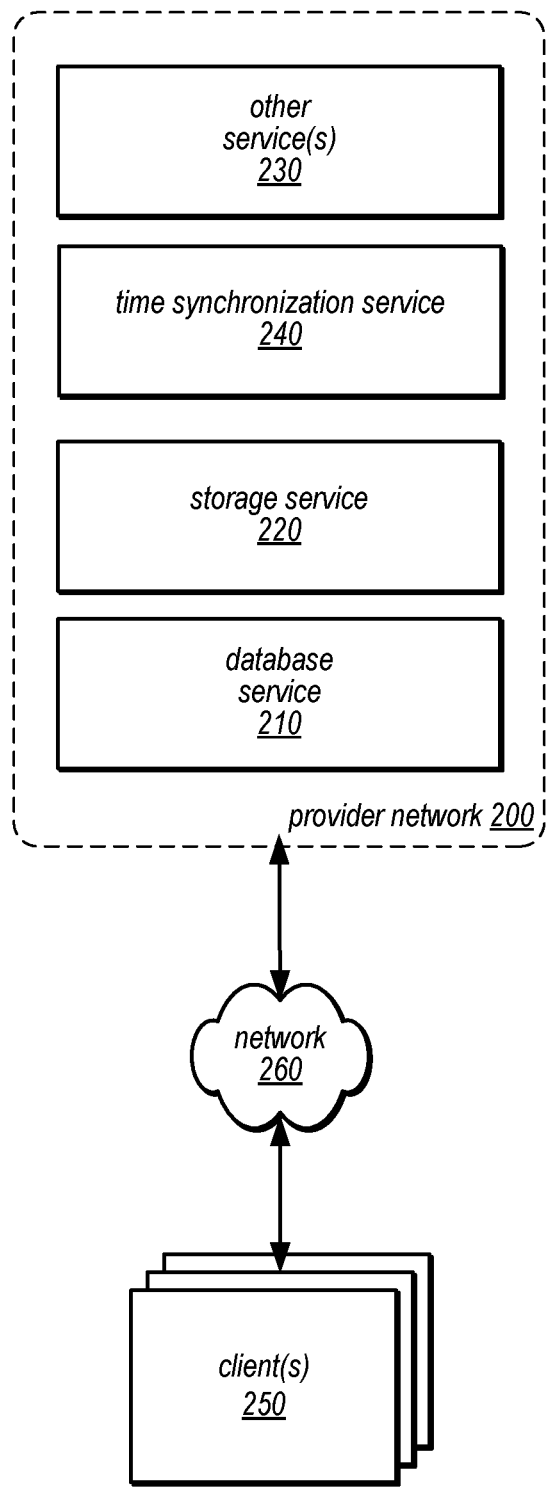
FIG. 2 is a block diagram illustrating a provider network that may implement a database service that supports both a client-managed table and system-managed table in a common database for which lease-based consistency management for handling failover may be implemented, according to some embodiments.

FIG. 2 is a block diagram illustrating a provider network that may implement a database service that supports both a client-managed table and system-managed table in a common database for which lease-based consistency management for handling failover may be implemented, according to some embodiments. A provider network, such as provider network 200, may be a private or closed system or may be set up by an entity such as a company or a public sector organization to provide one or more services (such as various types of cloud-based storage) accessible via the Internet and/or other networks to clients 250, in some embodiments. The provider network 200 may be implemented in a single location or may include numerous provider network regions that may include one or more data centers hosting various resource pools, such as collections of physical and/or virtualized computer servers, storage devices, networking equipment and the like (e.g., computing system 3000 described below with regard to FIG. 12), needed to implement and distribute the infrastructure and storage services offered by the provider network within the provider network regions.

For example, provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In the illustrated embodiment, a number of clients (shown as clients 250 may interact with a provider network 200 via a network 260. Provider network 200 may implement respective instantiations of the same (or different) services, a database services 210, proxy service 240, a storage service 220 and/or one or more other virtual computing service 230 across multiple provider network regions, in some embodiments. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 12 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to provider network region 200 via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style web services architecture, a document- or message-based network-based services architecture, or another suitable network-based services architecture. Although not illustrated, some clients of provider network 200 services may be implemented within provider network 200 (e.g., a client application of database service 210 implemented on one of other virtual computing service(s) 230), in some embodiments. Therefore, various examples of the interactions discussed with regard to clients 250 may be implemented for internal clients as well, in some embodiments.

In some embodiments, a client 250 (e.g., a database service client) may be may provide access to network-based storage of database tables to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to provider network 200 may be coordinated by client 250 and the operating system or file system on behalf of applications executing within the operating system environment.

Clients 250 may convey network-based services requests to and receive responses from provider network 200 via network 260. In various embodiments, network 260 may encompass any suitable combination of networking hardware and protocols necessary to establish network-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. For example, clients 250 may be provisioned within the same enterprise as a database service system (e.g., a system that implements database service 210 and/or storage service 220). In such a case, clients 250 may communicate with provider network 200 entirely through a private network 260 (e.g., a LAN or WAN that may use Internet-based communication protocols but which is not publicly accessible).

Generally speaking, provider network 200 may implement one or more service endpoints may receive and process network-based services requests, such as requests to access a database (e.g., queries, inserts, updates, etc.) and/or manage a database (e.g., create a database, configure a database, etc.). For example, provider network 200 may include hardware and/or software may implement a particular endpoint, such that an HTTP-based network-based services request directed to that endpoint is properly received and processed. In one embodiment, provider network 200 may be implemented as a server system may receive network-based services requests from clients 250 and to forward them to components of a system that implements database service 210, time synchronization service 240, storage service 220 and/or another service(s) 230 for processing. In other embodiments, provider network 200 may be configured as a number of distinct systems (e.g., in a cluster topology) implementing load balancing and other request management features may dynamically manage large-scale network-based services request processing loads. In various embodiments, provider network 200 may be may support REST-style or document-based (e.g., SOAP-based) types of network-based services requests.

In addition to functioning as an addressable endpoint for clients' network-based services requests, in some embodiments, provider network 200 may implement various client management features. For example, provider network 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network 200 may also implement financial accounting and billing systems, or may maintain a database of usage data that may be queried and processed by external systems for reporting and billing of client usage activity. In certain embodiments, provider network 200 may collect, monitor and/or aggregate a variety of storage service system operational metrics, such as metrics reflecting the rates and types of requests received from clients 250, bandwidth utilized by such requests, system processing latency for such requests, system component utilization, such as the target capacity determined for individual database engine head node instances, network bandwidth and/or storage utilization, rates and types of errors resulting from requests, characteristics of stored and databases (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another service 230 (or the underlying systems that implement those services).

In some embodiments, provider network 200 may also implement user authentication and access control procedures. For example, for a given network-based services request to access a particular database table, provider network 200 ascertain whether the client 250 associated with the request is authorized to access the particular database table. Provider network 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, provider network 200 may reject the corresponding network-based services request, for example by returning a response to the requesting client 250 indicating an error condition. Various access control policies may be stored as records or lists of access control information by database service 210, storage service 220 and/or other virtual computing services 230.

Note that in many of the examples described herein, services, like database service 210 or storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network (e.g., through an API directly between the systems that implement these services). In such embodiments, the use of storage service 220 in storing database tables on behalf of clients 250 may be transparent to those clients. In other embodiments, storage service 220 may be exposed to clients 250 through provider network region to provide storage of database tables or other information for applications other than those that rely on database service 210 for database management. In such embodiments, clients of the storage service 220 may access storage service 220 via network 260 (e.g., over the Internet). In some embodiments, a virtual computing service 230 may receive or use data from storage service 220 (e.g., through an API directly between the virtual computing service 230 and storage service 220) to store objects used in performing computing services 230 on behalf of a client 250. In some cases, the accounting and/or credentialing services of provider network region may be unnecessary for internal clients such as administrative clients or between service components within the same enterprise.

Note that in various embodiments, different storage policies may be implemented by database service 210 and/or storage service 220. Examples of such storage policies may include a durability policy (e.g., a policy indicating the number of instances of a database table (or data page thereof, such as a quorum-based policy) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, storage service 220 may implement a higher durability for redo log records than for data pages.

Figure 3:
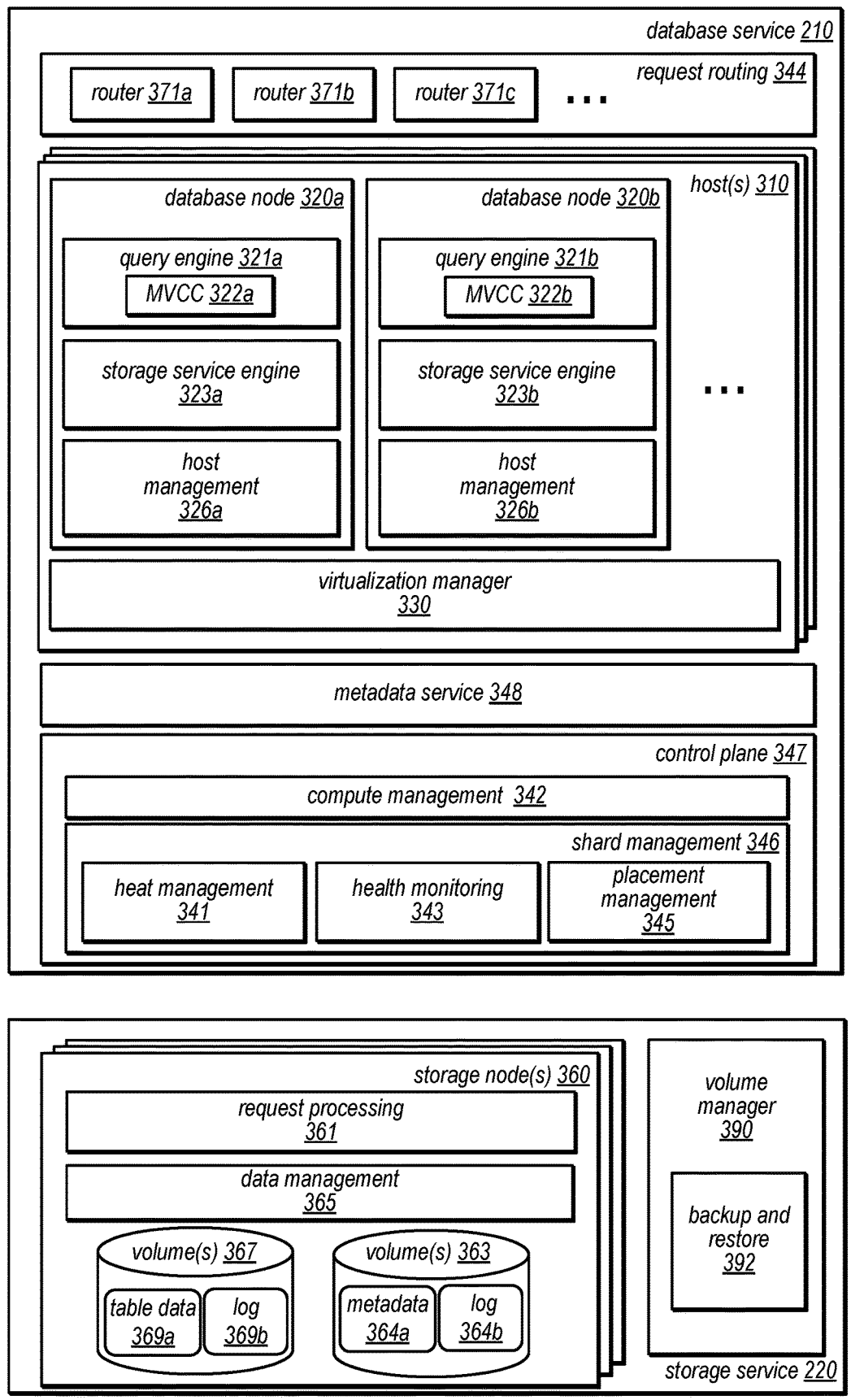
FIG. 3 is a block diagram illustrating various components of a database service and storage service that supports both a client-managed table and system-managed table in a common database, according to some embodiments.

FIG. 3 is a block diagram illustrating various components of a database service and storage service that supports both a client-managed table and system-managed table in a common database, according to some embodiments. Database service 210 may implement control plane 347 which may manage the creation, provisioning, deletion, or other features of managing a database hosted in database service 210. For example, control plane 347 may monitor the performance of host(s) 310 (e.g., a computing system or device like computing system 3000 discussed below with regard to FIG. 12) via compute management 342 and shard management 346 (e.g., via heat management 341) for high workloads (e.g., heat) and move or shard assignments away from some hosts to avoid overburdening host(s) 310. Control plane 347 may handle various management requests, such as request to create databases, manage databases (e.g., by configuring or modifying performance, such as by enabling a "limitless table feature" or other automated management feature in response to a request which may cause in-place resource scaling to be enabled for that system-managed table. Control plane 347 may implement shard management 346 for system-managed tables to handle heat management 341, health monitoring 343 and placement management 345, as well as overall compute management 342 (e.g., also for client-managed tables).

Database service 210 may implement one or more different types of database systems with respective types of query engines for accessing database data as part of the database. In at least some embodiments, database service 210 may be a relational database service that hosts relational databases on behalf of clients. For example, database service 210 may implement various types of connection-based (e.g., having established a network connection between a database client and a router for an endpoint of a database which may route requests to various database nodes which may, for instance, facilitate the performance of various operations that continue over multiple communications between the database client and a connected router of a pool of routers 371a, 371b, 371c, and so on, of request routing 344 (or directly to a database node in some scenarios as discussed below with regard to FIG. 5).

In some embodiments, pool of routers 371 may be assigned to a particular database, such that the combination of routers 371 and database nodes 320 may be considered a cluster. For example, when a client opens a client connection, the DNS (or NLB) will re-direct the physical socket connection to one of the routers 371. Since the routers 371 serve as the front end for all traffic, they may be implemented to be highly available. The routers may be similar to (e.g., run same engine binaries) to database nodes 310 and may, in some embodiments, host database tables (not illustrated). Each router 371 may be attached to one or more data stores to store metadata (and in some embodiments table data) and temporary tables or other temporary data that may need to be persisted locally. In some embodiments, a router 371 may be designated a router leader (e.g., one of a group of routers). The router leader will be the primary owner of system-managed table metadata. The router leader may also serve as the coordinator when necessary for operations that might require serialization. In some embodiments, routers 371 may be distributed across fault tolerance or other availability zones and may perform router failover (or router addition) in order to maintain high availability for a database to which the pool of routers are assigned.

Figure 5:
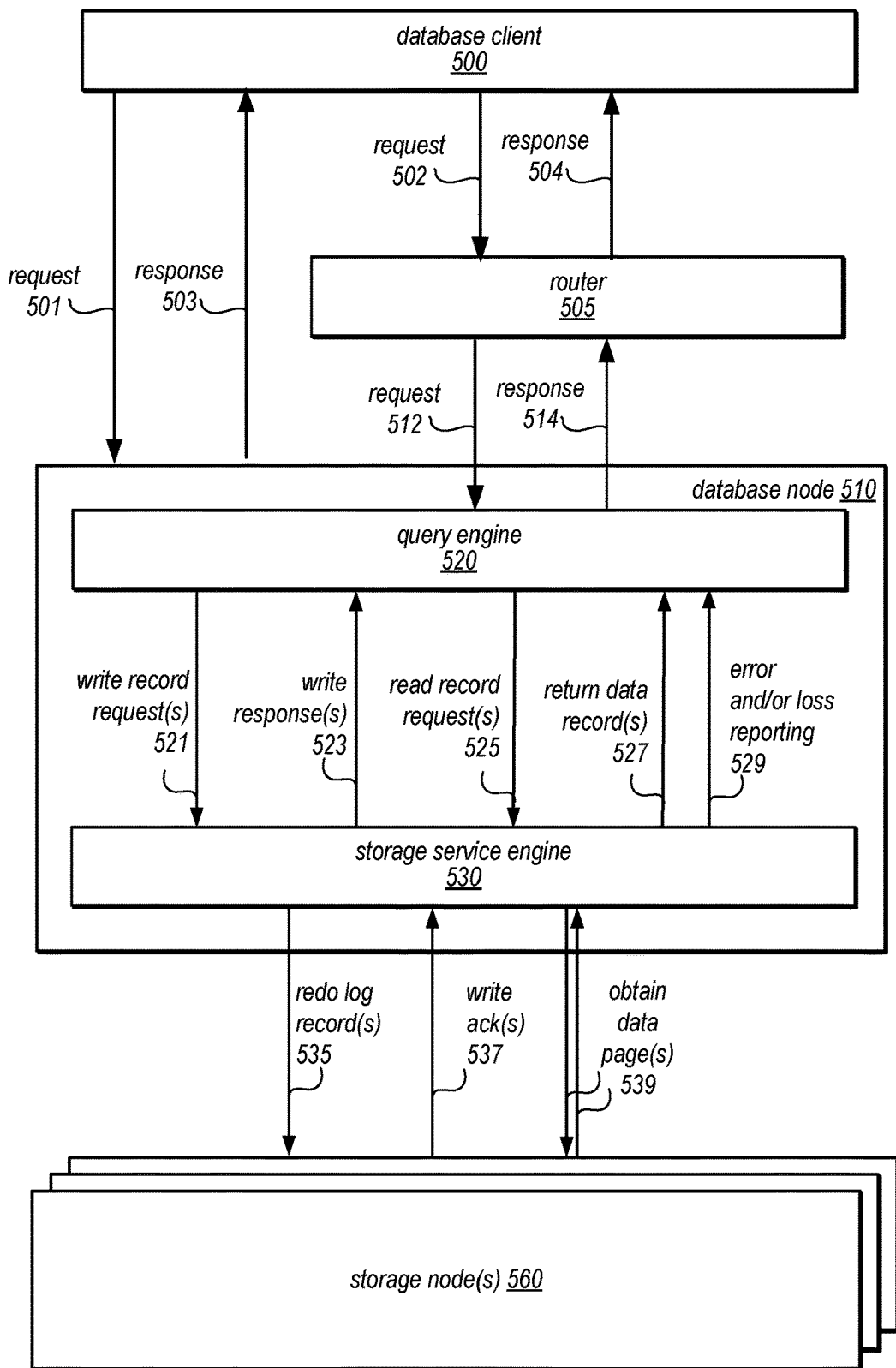
FIG. 5 is a block diagram illustrating various interactions to handle database client requests, according to some embodiments.
Figure 7:
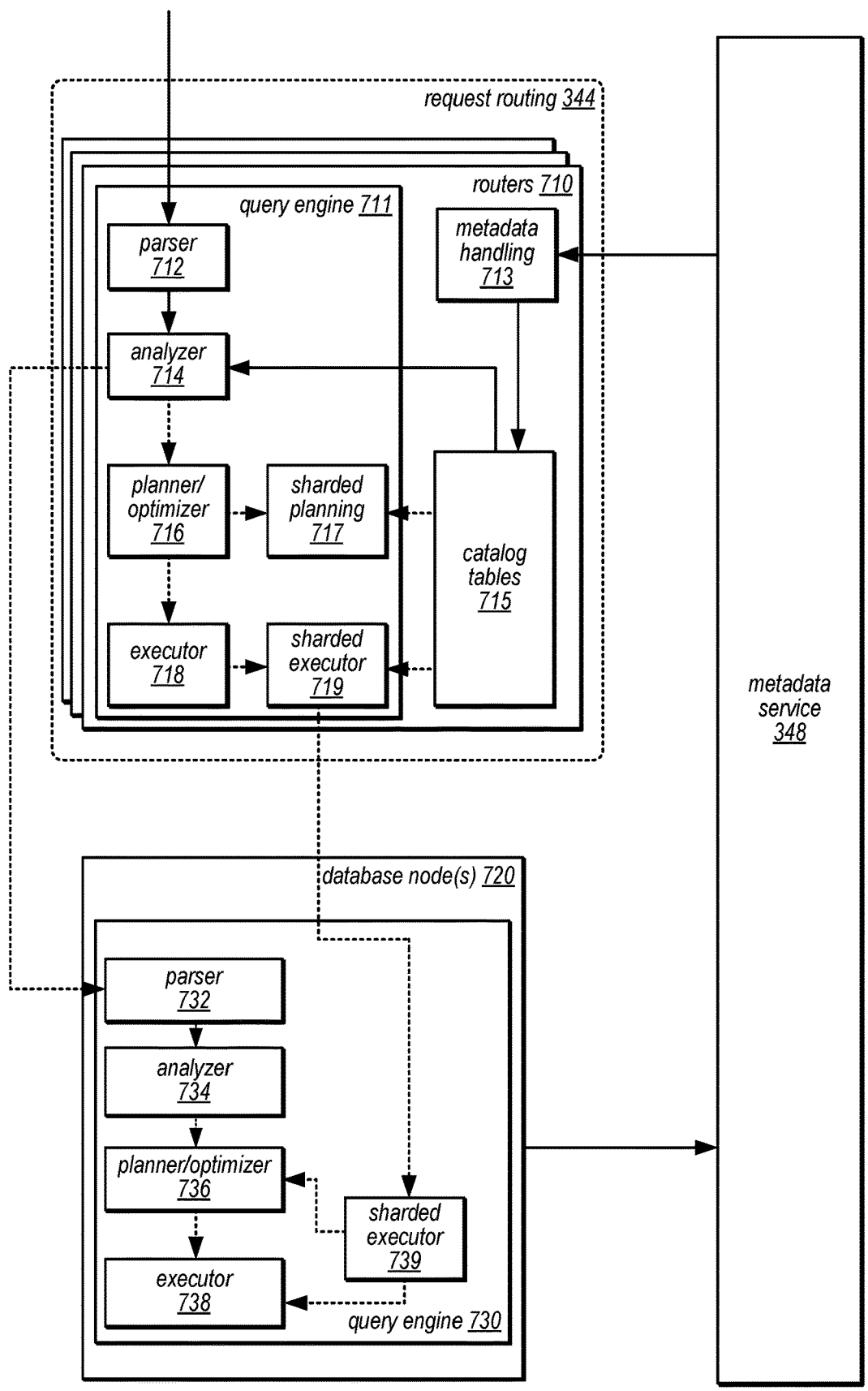
FIG. 7 is a logical block diagram illustrating a router that performs intelligent query routing across client-managed and system-managed tables, according to some embodiments.

In some embodiments, routers 371 may implement respective connection managers (not illustrated). As router nodes may mostly pull the data from database nodes for shards of a system-managed table (though not always as illustrated in some of the example distributed transaction techniques discussed below), in some embodiments, there may be a DB connection pool from every router 371 to every database node (e.g., for a database). However, reusing connections from one query engine (at a router as depicted in FIG. 7) to another (e.g., to a query engine implemented on a database node, also depicted in FIG. 7) cannot usually be done between users. In such scenarios, the connection manager may be responsible for cleaning up a database connection (with a client application as depicted in FIG. 5) after database session is closed (e.g., performing operations to clear data such as session configuration, user/role info, etc.) and starting processes, instances, or other components (e.g., pgBouncer instances for Postgres databases) for cases when new database nodes 320 and routers 371 nodes are added to a database with system-managed tables for a user as part of scale-out of database nodes or routers or recovery/replacement of existing database nodes or routers. When a new client application database connection to a router 371 needs to contact other nodes (e.g., router or a database node) it does so through foreign data wrapper (FDW) managed foreign server, which may be modified to contact a local connection manager for getting an available database connection at which moment the session context may be set based on an original database connection to a router. This may include session configuration (e.g., selective) and user/role info. With that, request routing 344 may ensure that access to remote objects respects privileges and as database nodes are computation nodes as well configuration is set (as it may not be common for FDW established connections which set just a user based on user mapping configured for a foreign server).

Database service 210 may implement a fleet of host(s) 310 which may provide, in various embodiments, a multi-tenant configuration so that different database nodes, such as database node 320a and 320b, can be hosted on the same host 310, but provide access to different databases on behalf of different clients over different connections. While hosts(s) 310 may be multi-tenant, each database node 320 may be provisioned on host(s) 310 in order to implement in-place scaling (e.g., by overprovisioning resources initially and then scaling-based on workload to right-size the capacity that it is recorded as utilized for an account that owns or is associated with the database that is accessed by the database engine head node 320).

In various embodiments, host(s) 310 may implement a virtualization technology, such as virtual machine based virtualization, wherein database engine head node instances 320 may be different respective virtual machines, micro virtual machines (microVMs) which may offer a reduced or light-weight virtual machine implementation that retains use of individual kernels within a microVM, or containers which offer virtualization of an operating system using a shared kernel. Host(s) 310 may implement virtualization manager 330, which may support hosting one or multiple separate database engine head node instances 320 as different respective VMs, microVMs, or containers. Virtualization manager 330 may support increasing or decreasing resources made available to host(s) 310 to use for other tasks (including other database engine head node(s) 320) that were allocated to a database engine head node 320 upon creation at host(s) 310, as discussed below with regard to FIG. 9.

Database node(s) 320 may support various features for accessing a database, such as query engine(s) 321a and 321b, including MVCCs 322a and 322b using consistency lease enforcement as discussed above with regard to FIG. 1 and below with regard to FIGS. 8-11, and storage service engine(s) 323a and 323b discussed in detail below with regard to FIGS. 5-7. Database nodes 320 may implement agents, interfaces, or other controls according to the respective type of virtualization used to collect and facilitate communication of utilization metrics for in-place scaling, among other supported aspects of virtualization, such as host management 326a and 326b. For example, host management 326 may implement resource utilization measurement, which may capture and/or access utilization information for host(s) 310 to determine which portion of utilization can be attributed to a specific database engine head node 320.

In some embodiments, database data for a database of database service 210 may be stored in a separate storage service 220. In some embodiments, storage service 220 may be implemented as to store database data as virtual disk or other persistent storage drives. In other embodiments, embodiments, storage service 220 may store data for databases using log-structured storage. Storage service 220 may implement volume manager 390, which may implement various features including backup and restore 392.

For example, in some embodiments, data may be organized in various logical volumes, segments, and pages for storage on one or more storage nodes 360 of storage service 220. For example, in some embodiments, each database may be represented by a logical volume, such as logical volumes 367 and 363 (which may include both table data 369a and corresponding log(s) 369(b) (e.g., redo logs). Table data 369a may be an entire table for a client-managed table or a shard of a system-managed table, as discussed in detail below. In some embodiments, volume(s) 363 may store metadata 364a for a database and a respective change log 364b. Each logical volume may be segmented over a collection of storage nodes 360. Each segment, which may live on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

In some embodiments, storage nodes 360 of storage service 220 may perform some database system responsibilities, such as the updating of data pages for a database, and in some instances perform some query processing on data. As illustrated in FIG. 3, storage node(s) 360 may implement data page request processing 361, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), clone volume creation, log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages to be returned responsive to a request.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

Figure 4:
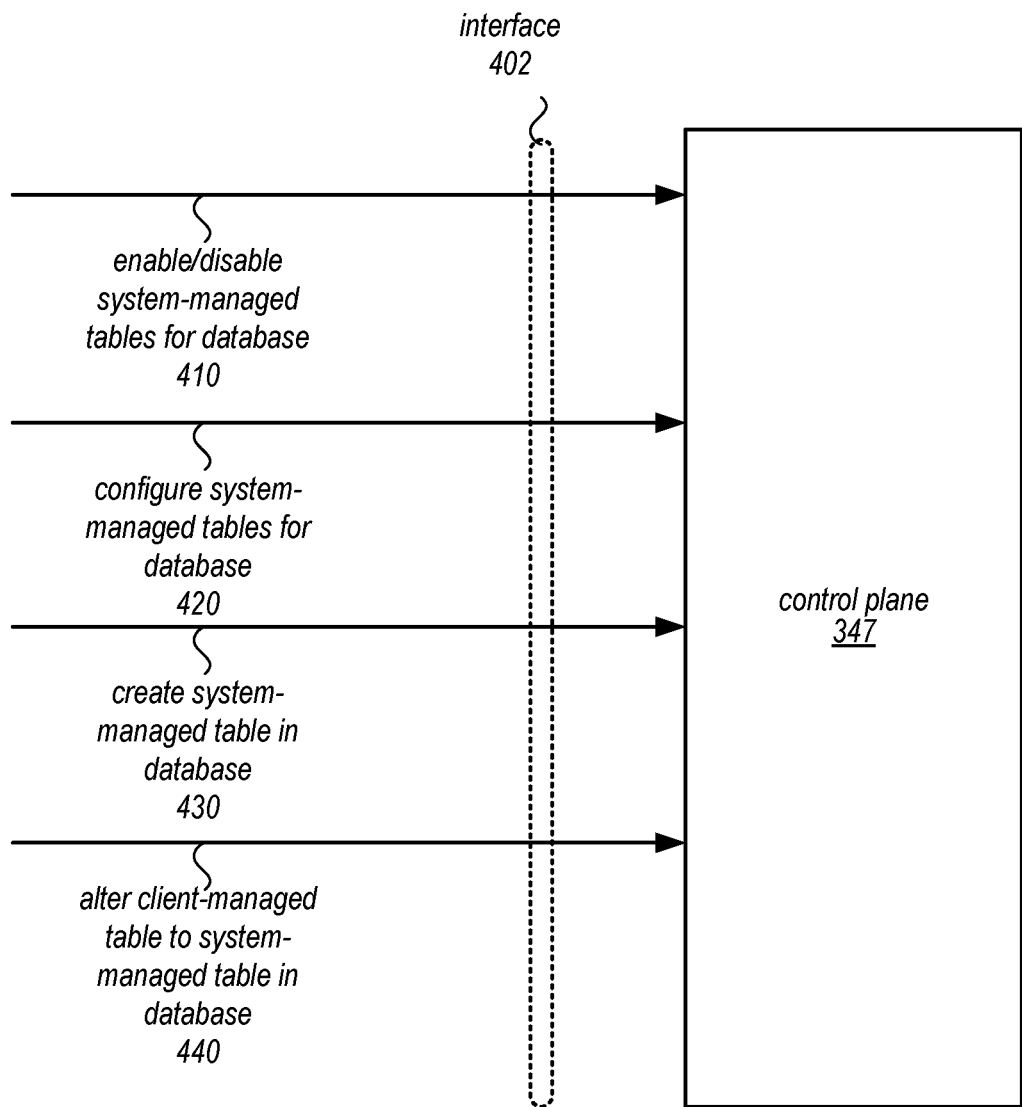
FIG. 4 is a block diagram illustrating various interactions to handle database client requests, according to some embodiments.

FIG. 4 illustrates interactions with a control plane of a database service for managing system-managed tables, according to some embodiments. Interface 402 may be a command line, programmatic (e.g., API), or graphical user interface for control plane 347. As indicated at 410, a request to enable or disable system-managed tables for a database may be received, in some embodiments. For example, the database may be identified (e.g., by identifier such as a number or resource number) along with the parameter set to enable or disable system-managed tables. In some embodiments, various system-management parameters, such as scaling limits for computing resources, including cost-based, resource-based, or other limitations, for instance as minimum and or maximum boundaries for scaling (or scaling within a period of time). As indicated at 420, these system-managed table parameters can be separately configured to add, remove, or change the parameters. In some embodiments, enabling system-managed tables may include parameters to configure the availability of the table across one (or more) availability zones.

Enabling system-managed tables may cause the creation of (or transfer of) a network endpoint (e.g., a network address) that is specific to the database to route requests to request routing 344 (which may assign or distribute the request to connect the database to different ones of routers 371 according to a load balancing scheme). In this way, connection requests to access the database (whether for a system-managed table or client-managed table) may be routed through request router 344 (e.g., instead of being routed directly to an existing database node already assigned to a current client-managed table of the database). These system-managed table parameters may be stored or updated in an administrative database and/or database metadata that is used to control database service 210 management of the database using various control plane features.

In some embodiments, control plane 347 may receive request to create a system-managed table in a database, as indicated at 430 or alter a client-managed table to a system managed table in the database, as indicated at 440. In some embodiments, these requests may be received at the database node for the database directly or at a router and thus may be received through the "data plane." These requests, however may then be forwarded or dispatched to control plane 347 to direct the operations to complete the requests.

Control plane 347 may perform the various operations to create or alter tables to system-managed tables. For example, aligned tables may be identified and stored across different shards, according to an initial placement hierarchy that may be determined for the system-managed table(s) (e.g., a default or standard hierarchy may be initially used and then modified overtime according various heat or operations). Various migration techniques may be used to move the existing table data to the appropriate shard or store, when received, new data into a table (e.g., as part of insert requests or batch updates to add table data). Control plane 347 may initialize or update metadata to identify the new (or altered) system-managed table so that routers may correctly identify and route requests to the appropriate database nodes. Control plane 347 may also provision or assign database nodes to shards of the system-managed table.

FIG. 5 is a block diagram illustrating various interactions to handle database client requests, according to some embodiments. In the example database system implemented as part of database service 210, a database engine head node 510 may be implemented for each database and storage nodes 560 (which may or may not be visible to the clients of the database system and may be similar to storage nodes 360 discussed above with regard to FIG. 3). Clients of a database may access a database node 510 directly in some embodiments (as indicated at request and response 503 instead of through router 510, such as requests that are directed to client-managed tables) via network utilizing various database access protocols (e.g., Java Database Connectivity (JDBC) or Open Database Connectivity (ODBC)). However, storage nodes 560, which may be employed by the database service 210 to store data pages of one or more databases (and redo log records and/or other metadata associated therewith) on behalf of clients, and to perform other functions of the database system as described herein, may or may not be network-addressable and accessible to database clients directly, in different embodiments. For example, in some embodiments, storage nodes 560 may perform various storage, access, change logging, recovery, log record manipulation, and/or space management operations in a manner that is invisible to clients of a database node 510.

As previously noted, a database node 510 may implement query engine 520 and storage service engine 530, in some embodiments. Query engine 520 may receive requests, like request 512, which may include queries or other requests such as updates, deletions, etc., from a router 505 connected to a database client 500 which first received the request 502 from the database client 500. Implementing a router 505 between database client 500 and database node 510 may allow for database service 210 implement both client-managed tables and system-managed tables in the same database, as discussed in detail below. Query engine 520 then parses them, optimizes them, and develops a plan to carry out the associated database operation(s), as discussed in detail below with regard to FIG. 7.

Query engine 520 may return a response 514 to the request (e.g., results to a query) which router 505 may provide as response 504 to database client 500, which may include write acknowledgements, requested data (e.g., records or other results of a query), error messages, and or other responses, as appropriate. As illustrated in this example, database node 510 may also include a storage service engine 530 (or client-side driver), which may route read requests and/or redo log records to various storage nodes 560 within storage service 220, receive write acknowledgements from storage nodes 560, receive requested data pages from storage nodes 560, and/or return data pages, error messages, or other responses to query engine 520 (which may, in turn, return them to a database client).

In this example, query engine 520 or another database system management component implemented at database engine head node 510 (not illustrated) may manage a data page cache, in which data pages that were recently accessed may be temporarily held. Query engine 520 may be responsible for providing transactionality and consistency in the database of which database engine head node 510 is a component. For example, this component may be responsible for ensuring the Atomicity, Consistency, and Isolation properties of the database and the transactions that are directed that the database, as discussed in detail below with regard to FIGS. 8-11, such as determining a MVCC snapshot time of the database applicable for a query, applying undo log records to generate prior versions of tuples of a database. Query engine 520 may manage an undo log to track the status of various transactions and roll back any locally cached results of transactions that do not commit.

For example, a request 512 that includes a request to write to a page may be parsed and optimized to generate one or more write record requests 521, which may be sent to storage service engine 530 for subsequent routing to storage service nodes 560. In this example, storage service engine 530 may generate one or more redo log records 535 corresponding to each write record request 521, and may send them to specific ones of the storage nodes 560 of storage service 220. Storage nodes 560 may return a corresponding write acknowledgement 537 for each redo log record 535 (or batch of redo log records) to database node 510 (specifically to storage service engine 530). Storage service engine 530 may pass these write acknowledgements to query engine 520 (as write responses 523), which may then send corresponding responses (e.g., write acknowledgements) to one or more clients as a response 514.

In another example, a request that is a query may cause data pages to be read and returned to query engine 520 for evaluation. For example, a query could cause one or more read record requests 525, which may be sent to storage service engine 530 for subsequent routing to storage nodes 560. In this example, storage service engine 530 may send these requests to specific ones of the storage nodes 560, and storage nodes 560 may return the requested data pages 539 to database node 510 (specifically to storage service engine 530). Storage service engine 530 may send the returned data pages to query engine 520 as return data records 527, and query engine 520 may then evaluate the content of the data pages in order to determine or generate a result of a query sent as a response 514.

In some embodiments, various error and/or data loss messages 541 may be sent from log-structured storage service 550 to database node 510 (specifically to storage service engine 530). These messages may be passed from storage service engine 530 to query engine 520 as error and/or loss reporting messages 529, and then to one or more clients as a response 514.

In some embodiments, the APIs 535-539 to access storage nodes 560 and the APIs 521-529 of storage service engine 530 may expose the functionality of storage service 220 to database node 510 as if database node 510 were a client of storage service 220. For example, database node 510 (through storage service engine 530) may write redo log records or request data pages through these APIs to perform (or facilitate the performance of) various operations of the database system implemented by the combination of database node 510 and storage nodes 560 (e.g., storage, access, change logging, recovery, and/or space management operations).

Note that in various embodiments, the API calls and responses between database node 510 and storage nodes 560 (e.g., APIs 521-529) and/or the API calls and responses between storage service engine 530 and query engine 520 (e.g., APIs 535-539) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C #and Perl to support integration with database node 510 and/or storage nodes 560.

Figure 6:
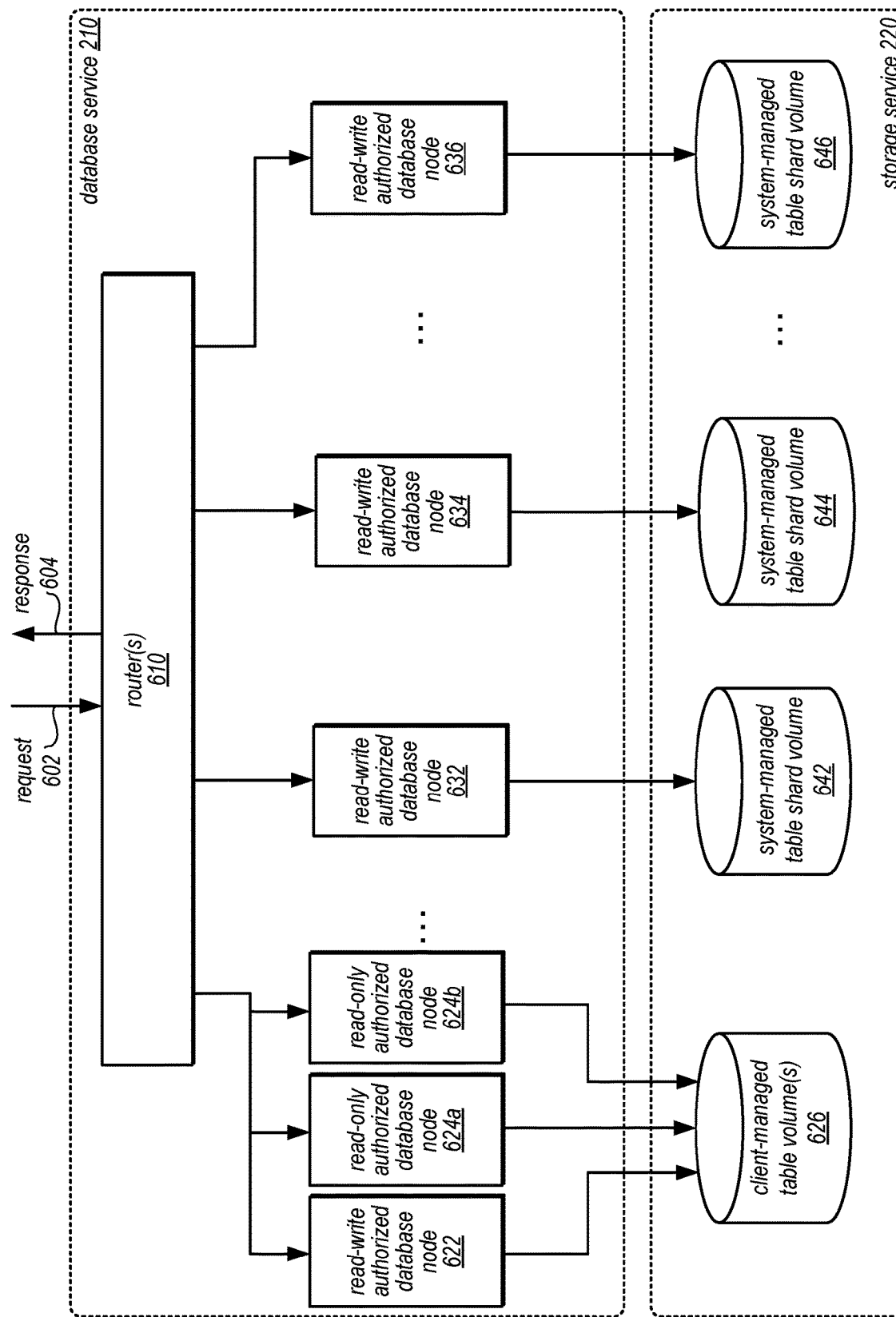
FIG. 6 is a logical block diagram illustrating interactions for a database that includes both a client-managed table and a system-managed table.

FIG. 6 is a logical block diagram illustrating interactions for a database that includes both a client-managed table and a system-managed table. Request 602 may be received at one of many routers 610 that are implemented as part of database service 210, as discussed above with regard to FIG. 3. A router 610 may accept the request and direct it to the appropriate database nodes using both the query planning location selection techniques and, if a transaction, commit protocol techniques, discussed below with regard to FIG. 7.

A client-managed table may be stored in a client-managed table volume 626 which may be connected to assigned database nodes, such as read-write authorized database node 622. In some embodiments, read-only nodes 624a and 624b, can also be assigned to increase read capacity. As discussed above with regard to FIG. 5, database node 622 can request data pages, send redo log records, and otherwise interact with client-managed table volumes for portions of access requests targeted to client-managed tables.

For a system-managed table, multiple shards may be determined assigned to different read-write database nodes 632, 634, and 636 respectively for shards stored in volumes 642, 644, and 646. Although not illustrated, read-only nodes may also be assigned to shards in order to satisfy the workload requirements on system-managed tables. The number of assigned database nodes and shards for a system-managed table may change over time as additional compute or storage capacity is needed. These changes may be determined automatically by database service 210 (e.g., via heat management 342).

FIG. 7 is a logical block diagram illustrating a router that performs intelligent query routing across client-managed and system-managed tables, according to some embodiments. Routers 710 may implement a query engine 711. When an access request is received, query engine 711 may parse the request at parser 712 and analyze the request at analyzer 714 to determine which shards or client-managed tables should be accessed to perform the access request according to catalog tables 715, which may be synchronized using metadata service 348 to obtain up-to-date shard, database node, and other assignments for tables in the database. Then, according to the analysis 714 different planning location(s) and execution paths (illustrated by the dotted line paths) may result. For example, network I/O minimization may be used to select between different distributed execution plans for access requests, in some embodiments.

For example, for router-selected planning, planner/optimizer 716 may generate a query plan and pass the plan off to sharded planning 717, which may add features to aggregate results from multiple database nodes at shards (and also a client-managed table if included in a request with one or more shards). The sharded plan may then be passed to executor 718 which may provide instructions to sharded executor 719 to perform at database node(s) 720. Database nodes 720 may perform different requests according to different execution paths (e.g., receiving subsets of plans for further planning/optimization 736 and then execution through sharded executor 739, or straight to executor 738 via sharded executor 739). Alternatively, when a database node is involved in performing a request (e.g., at only one database node), then the request may be sent for parsing 732, analysis 734, planning/optimization 736, and optimization 738. Although not depicted results may be returned from the database node(s) 720 to router 710 to return to a client (as depicted in FIG. 5).

Updates that are caused to metadata (e.g., changes to database schemas by DDL requests or modifications to client-managed tables that are replicated), may be reported through metadata service 348.

Figure 8:
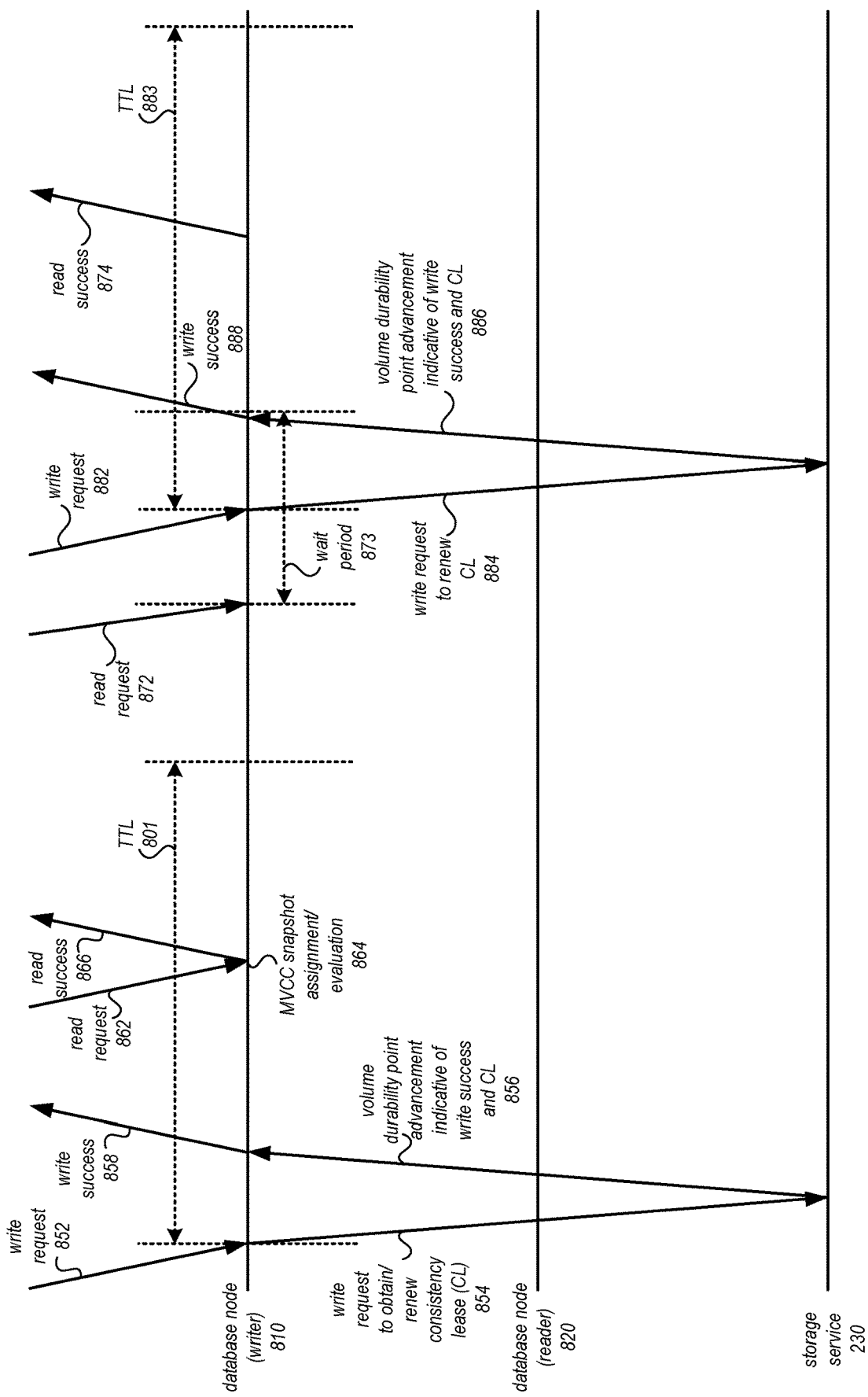
FIG. 8 is a sequence diagram illustrating interactions to renew a consistency lease and handle access requests for a database, according to some embodiments.

As discussed above with regard to FIG. 2, query engines of database nodes may implement MVCC to provide read-after-write consistency through snapshot isolation. FIG. 8 is a sequence diagram illustrating interactions to renew a consistency lease and handle access requests for a database, according to some embodiments. In the illustrated example, a database node 810 may be a writer (e.g., a read-write authorized database node for a table shard of a system managed table or a client-managed table). Database node 820 may be a reader (e.g., a read-only database node for a table shard of a system managed table or a client-managed table). The illustrated requests, such as write request 852, read request 862, read request 872, write request 882, and responses, such as write success 858, read success 866, write success 888 and read success 874, may be received from and returned to a client of the database service (e.g., for a client managed table not using a router to access the database) or may be received from and returned to a router (e.g., for a system-managed table).

Write request 852 may be received and cause database node 810 to perform the write request and obtain/renew a consistency lease, as indicated at 854 (e.g., if a consistency lease held by database node 810 is no longer valid (e.g., has expired because a MVCC snapshot point in time for the write is greater than the CL point in time. As indicated at 856, a response from storage service 230 may be returned indicating that a volume durability point advanced (e.g., quorum was obtained for the write and it did not conflict with another write (or "won" any conflict)). The volume durability point may, in some embodiments, be referred to as a volume durability log sequence number (VDL). In some embodiments, the VDL may correspond to the latest consistency point log sequence number (CPL), which may be the CPL that may match or exceed the MVCC snapshot time assigned to the write request 852. With the receipt of the indication, then a new/renewed consistency lease may be determined by adding an amount of time for a time to live (TTL) to the point in time of the consistent point (or state) of the database (e.g., the CPL). As illustrated in FIG. 8, the TTL may indicate the end of the validity of the consistency lease when it expires (e.g., at the end of the range indicated at 801). TTL 801 may be the same amount used for each new CL or renewal of a CL. As indicated at 858, a success indication of the write may be sent.

When read request 862 is received, an MVCC snapshot point in time may be assigned (e.g., a current timestamp) and evaluated with respect to the CL. IF the MVCC snapshot point in time is less (or earlier) than the CL (e.g., the CL has not expired because the point in time of the CL is in the future of the MVCC snapshot time), then the read may be performed (e.g., either by accessing storage service 230 or using a local cache) according to the snapshot of the database indicated by the MVCC snapshot point in time. A success indication may be returned, as indicated at 866.

As indicated at 872, another read request may be received at database node 810. The CL lease may be expired (e.g., the read request MVCC snapshot point in time is greater than, and thus later than, the range of time indicated by TTL 801. Thus, a wait period for the read request may occur, as indicated at 873, until a new CL is obtained. For example, write request 882 may be a client application read (or from a router), which may cause database node 810 to perform the write, which may also allow database node 810 to renew the CL. If successful, as indicated at 886, then the application of the TTL 883 may allow the write success to be indicated at 888, and, as indicated at 874, the read (872) to be performed with a success being returned. In some embodiments, a heartbeat write that originates with database node 810 (not received from a client/router), may be performed to attempt to renew a lease if, for example, no writes are received within a period of time (or periodically performed irrespective of when writes are received).

Figure 9:
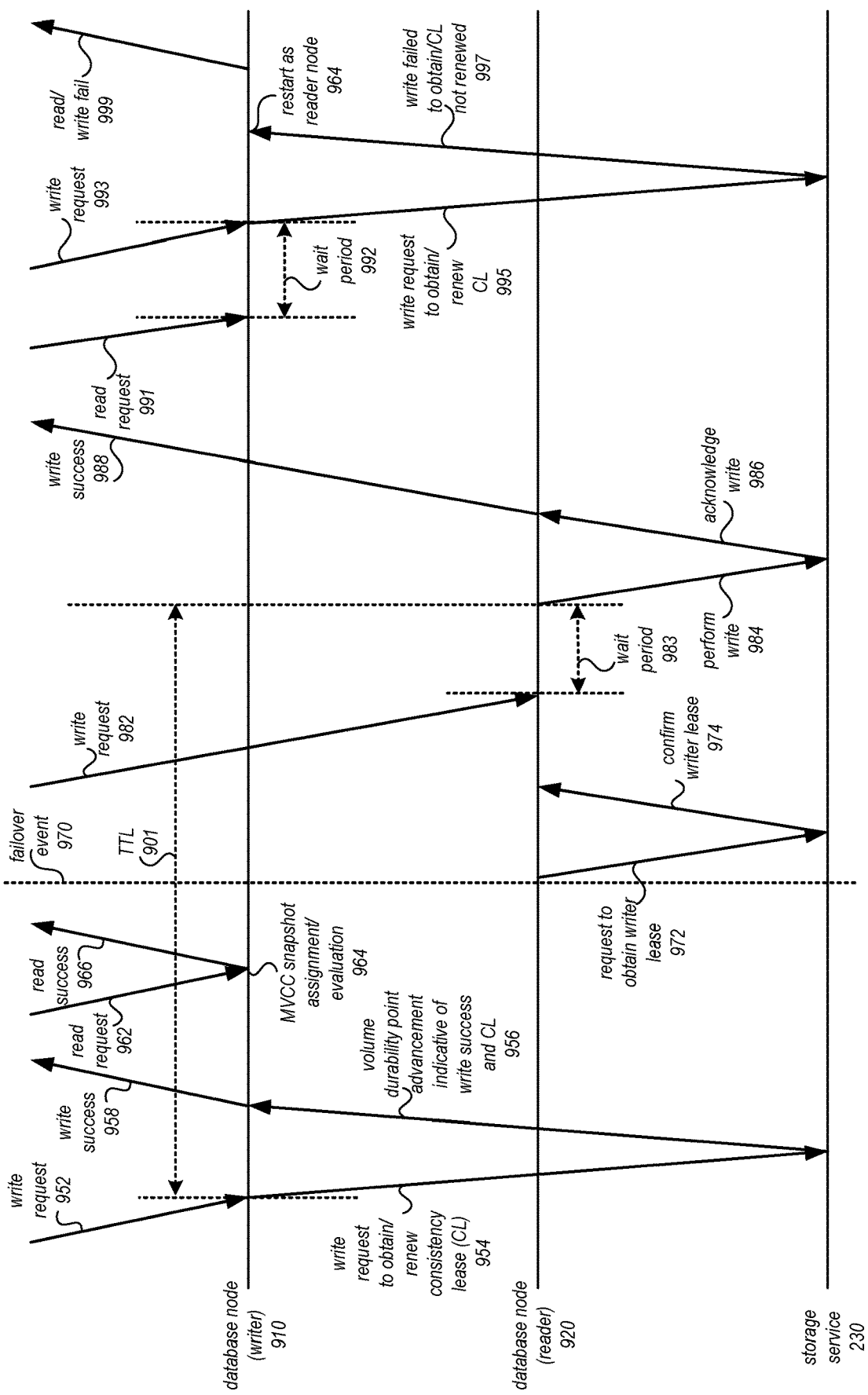
FIG. 9 is a sequence diagram illustrating interactions to handle failover using a consistency lease and handle access requests for a database, according to some embodiments.

As discussed above with regard to FIG. 1, consistency lease-based techniques may allow for database nodes to independently reason over and handle failover scenarios. FIG. 9 is a sequence diagram illustrating interactions to handle failover using a consistency lease and handle access requests for a database, according to some embodiments. Similar to FIG. 8, a database node 910 may be a writer (e.g., a read-write authorized database node for a table shard of a system managed table or a client-managed table). Database node 920 may be a reader (e.g., a read-only database node for a table shard of a system managed table or a client-managed table). The illustrated requests, such as write request 952, read request 962, write request 982, read request 991, and write request 993, and responses, such as write success 958, read success 966, write success 988 and read/write failure 999, may be received from and returned to a client of the database service (e.g., for a client managed table not using a router to access the database) or may be received from and returned to a router (e.g., for a system-managed table).

Write request 952 may be received and cause database node 910 to perform the write request and obtain/renew a consistency lease, as indicated at 954 (e.g., if a consistency lease held by database node 910 is no longer valid (e.g., has expired because a MVCC snapshot point in time for the write is greater than the CL point in time. As indicated at 956, a response from storage service 230 may be returned indicating that a volume durability point advanced (e.g., quorum was obtained for the write and it did not conflict with another write (or "won" any conflict)). The volume durability point may, in some embodiments, be referred to as a volume durability log sequence number (VDL). In some embodiments, the VDL may correspond to the latest consistency point log sequence number (CPL), which may be the CPL that may match or exceed the MVCC snapshot time assigned to the write request 952. With the receipt of the indication, then a new/renewed consistency lease may be determined by adding an amount of time for a time to live (TTL) to the point in time of the consistent point (or state) of the database (e.g., the CPL). As illustrated in FIG. 9, the TTL may indicate the end of the validity of the consistency lease when it expires (e.g., at the end of the range indicated at 901). TTL 901 may be the same amount used for each new CL or renewal of a CL. As indicated at 958, a success indication of the write may be sent.

When read request 962 is received, an MVCC snapshot point in time may be assigned (e.g., a current timestamp) and evaluated with respect to the CL. IF the MVCC snapshot point in time is less (or earlier) than the CL (e.g., the CL has not expired because the point in time of the CL is in the future of the MVCC snapshot time), then the read may be performed (e.g., either by accessing storage service 230 or using a local cache) according to the snapshot of the database indicated by the MVCC snapshot point in time. A success indication may be returned, as indicated at 966.

As indicated at 970, a failover event may occur. The failover event 970 may be a component failure of the database (e.g., database node 910) or a failure of communications (e.g., network partition) between various components 910, 920, and/or 230. As a result, database node 920 may be instructed (e.g., by a control plane 347) or detect (e.g., by a communication message failure, such as a lack of a heartbeat message from database node 910) to assume the role of writer for the database. Thus, database node 920 may obtain 972 a writer lease (e.g., write to storage service 230), and receive confirmation of the writer lease 974. A write lease may be tracked in storage service 230 and may indicate which database node is assigned as the single-writer to the database data.

Figure 11:
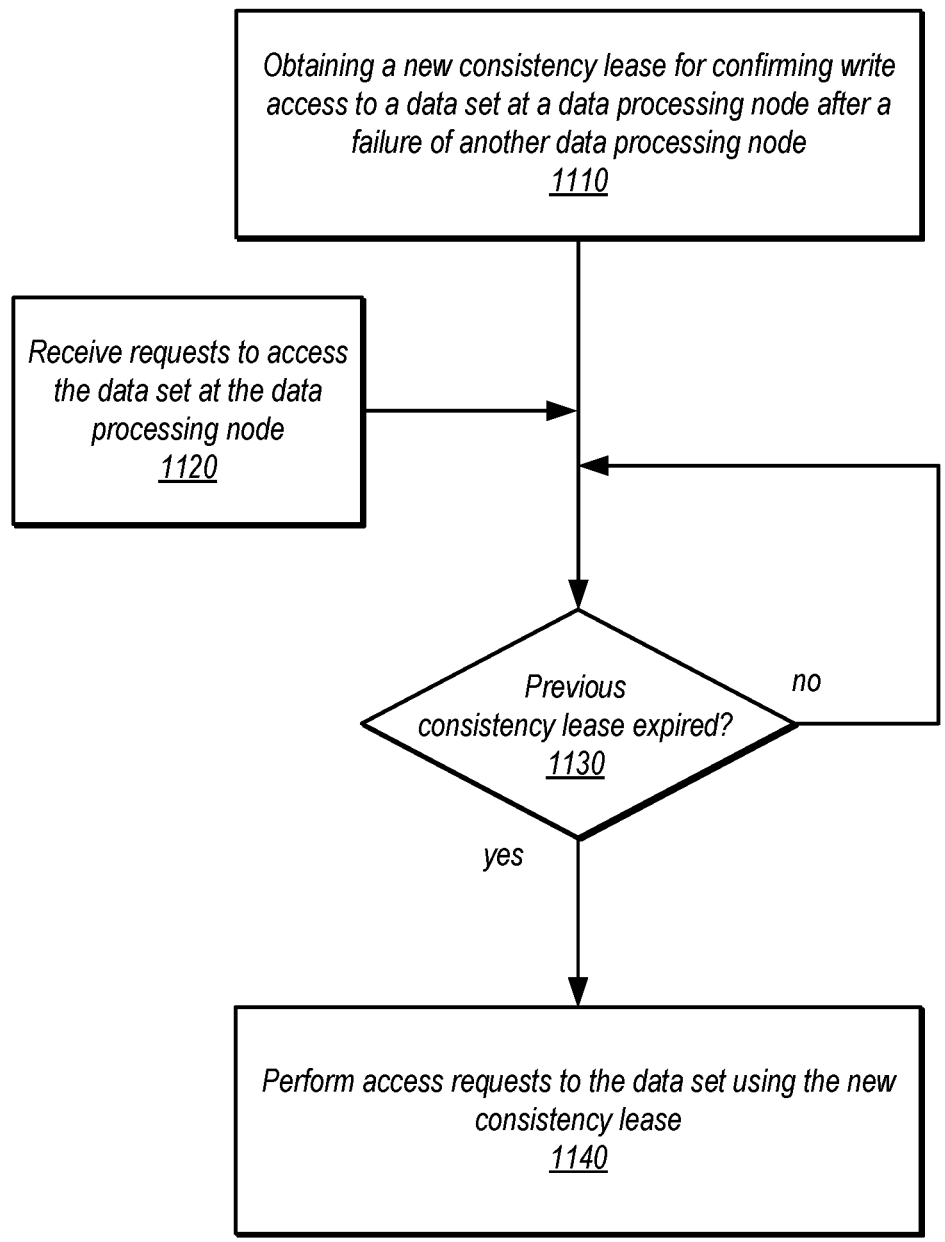
FIG. 11 is a high-level flowchart illustrating various methods and techniques to implement recovery from a failover at a database node, according to some embodiments.

Various techniques discussed below with regard to FIG. 11 may provide further details of the actions taken by node 910 as part of recovery from the failover. For example, write request 982 may be received at database node 920, which may enforce a wait period and delay performance 983 until the end of the previous CL (e.g., after TTL 901) so that no further writes by database node 910 may be missed by database node 920. Then, as indicated at 984, the write may be performed and success may be returned, via acknowledgement 986 and response 988.

Database node 910 may determine that it is no longer the writer. For example, a read request may be received, as indicated at 991. A wait period may be enforced, as indicated at 992, until a write request 993 is received (or a heartbeat write is performed). Database node 910 may perform the write request to obtain/renew the CL, as indicated at 995. However, the write may not succeed (e.g., storage service 230 may determine whether the write has a timestamp value or otherwise conflicts with a current leaseholder, and reject the write, as indicated at 997. Then, database node 910 may return a failure response 999 for both read request 991 and write request 993. In some embodiments, database node 910 may restart as a read-only node, as indicated at 964.

The database service and storage service discussed in FIGS. 2 through 9 provide examples of a database system that may implement client-managed tables and system-managed tables in a database which also use consistency leases for handling failover scenarios. However, various other types of data processing systems may implement multiple data processing nodes and thus make use of lease-based consistency management for handling failover in a data set.

Figure 10:
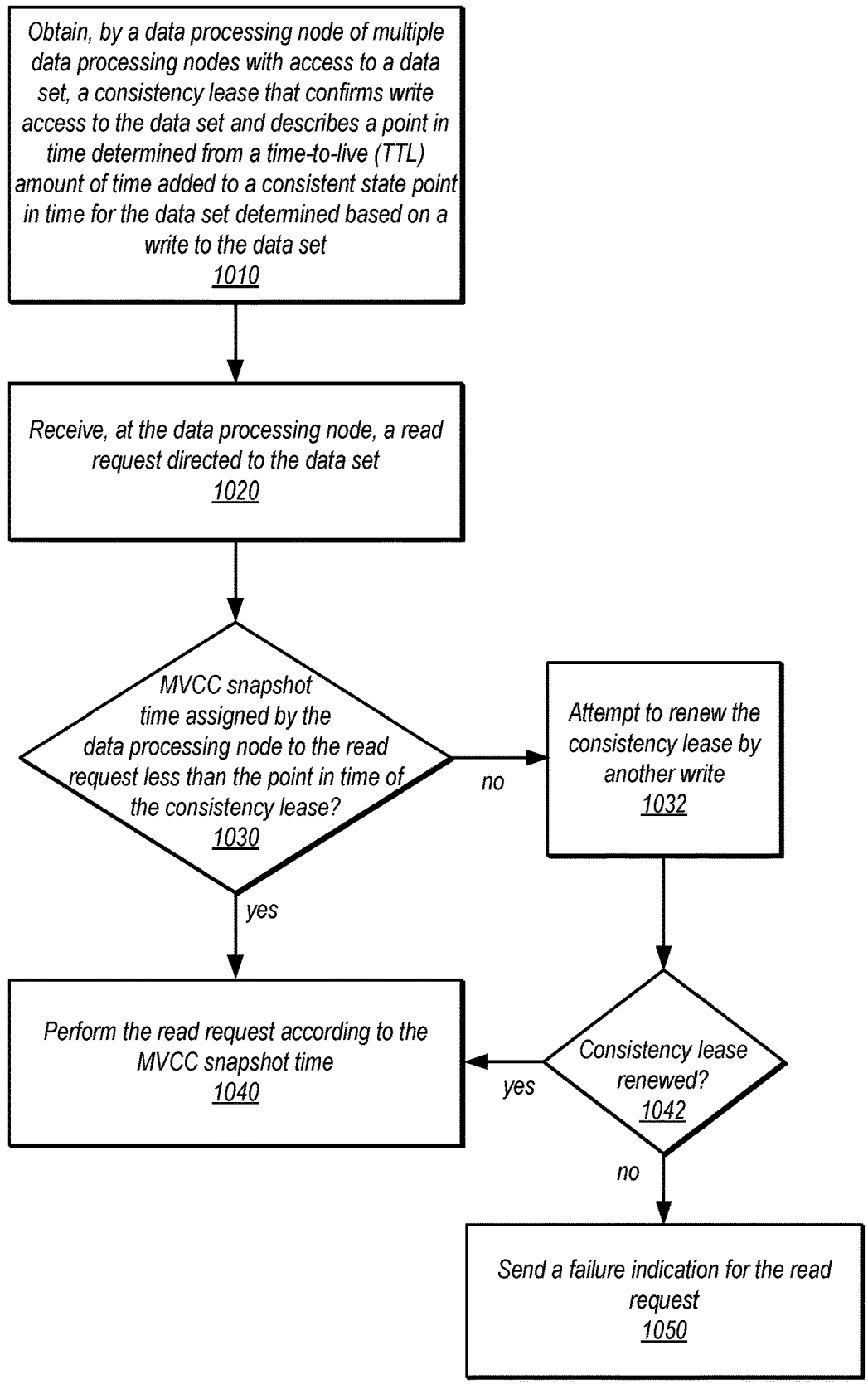
FIG. 10 is a high-level flowchart illustrating various methods and techniques to implement lease-based consistency management for handling failover in a database, according to some embodiments.

FIG. 10 is a high-level flowchart illustrating various methods and techniques to implement lease-based consistency management for handling failover in a data set, according to some embodiments. Various different systems and devices may implement the various methods and techniques described below, either singly or working together. For example, a database service and storage service as discussed above may implement the various methods. Alternatively, a combination of different systems and devices may implement the various techniques. Therefore, the above examples and or any other systems or devices referenced as performing the illustrated method, are not intended to be limiting as to other different components, modules, systems, or configurations of systems and devices.

As indicated at 1010, a data processing node (e.g., a database node or other node that provides MVCC access to a data set) may obtain a consistency lease that confirms write access to the data set (e.g., database data or various other data sets for which MVCC access may be applied), in various embodiments. The consistency lease may be obtained based on a write performed by the data processing node to the data set. The write may be a client (or router) requested write, or may be a heartbeat write. The consistency lease and describes a point in time determined from a time-to-live (TTL) amount of time (e.g., 10 seconds) added to a consistent state point in time for the data set. The consistent state point in time may be determined, in some embodiments, based on a consistent point of a volume or other storage structure for the data set. For example, in some embodiments (as discussed above with regard to FIGS. 2-7), storage for the data set may be log structured and thus the log of changes to the data set (e.g., a redo log) may be maintained and consistent and durable up to a point in time (e.g., as the storage system may be distributed as well and may store multiple copies to satisfy a durability requirement (e.g., quorum)). This point in time may be the VDL, in some embodiments. So if the VDL is a timestamp value of X, then the consistency lease may be valid until X+TTL (after which the consistency lease may be expired unless it is renewed). In some embodiments, times used for consistency point LSN (CPL), VDL, or various other points in time for various other embodiments may be obtained using a time synchronization agent on the data processing node which may provide a synchronized time as part of a time synchronization service.

As indicated at 1020, a read request may be received at the data processing node directed to the data set, in some embodiments. A MVCC snapshot point in time (e.g., timestamp) may be assigned to the read request (e.g., based on a current time and/or ordering of requests at the data processing node). In some embodiments, a time synchronization service may be used to provide the time to determine the MVCC point in time. As indicated at 1030, an evaluation of the MVCC snapshot time assigned by the data processing node to the read request as compared with the point in time of the consistency lease may be made. If less, then as indicated by the positive exit from 1030, the read request may be performed according to the MVCC snapshot time.

If not, then as indicated at 1032, an attempt to renew the consistency lease may be made by the data processing node (e.g., by performing a write to the data set). If successful, as indicated by the positive exit from 1042, then the read request may be performed, as indicated at 1040. If not, then a failure indication of the read request may be sent, as indicated at 1050.

When failovers occur, a data processing node may perform recovery to provide write access to the data set. FIG. 11 is a high-level flowchart illustrating various methods and techniques to implement recovery from a failover at a data processing node, according to some embodiments. As indicated at 1110, a new consistency lease may be obtained for confirming write access to a data set at a data processing node after a failover from another data processing node, in some embodiments. As discussed above, the consistency lease may be obtained from a write or using a truncation point (e.g., in a log-based storage that indicates the point at which redo log records are complete for the log to restore to a consistent state, such as VDL determined by a highest value CPL).

As indicated at 1120, requests to access the data set (e.g., read and write requests) may be received, in some embodiments. A wait period may be enforce by waiting until the previous consistency lease is expired, as indicated at 1130. Then, the access requests may be performed, in some embodiments, as indicated at 1140. In other embodiments, waits may occur until an acknowledgment from the holder of the previous consistency lease (e.g., a failed data processing node) has sent an indication that it has released or relinquished the consistency lease to the other data processing node. In some embodiments, fulfillment of either condition (e.g., expiration or received acknowledgement) may allow the other data processing node to perform access requests using a new consistency lease.

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 12:
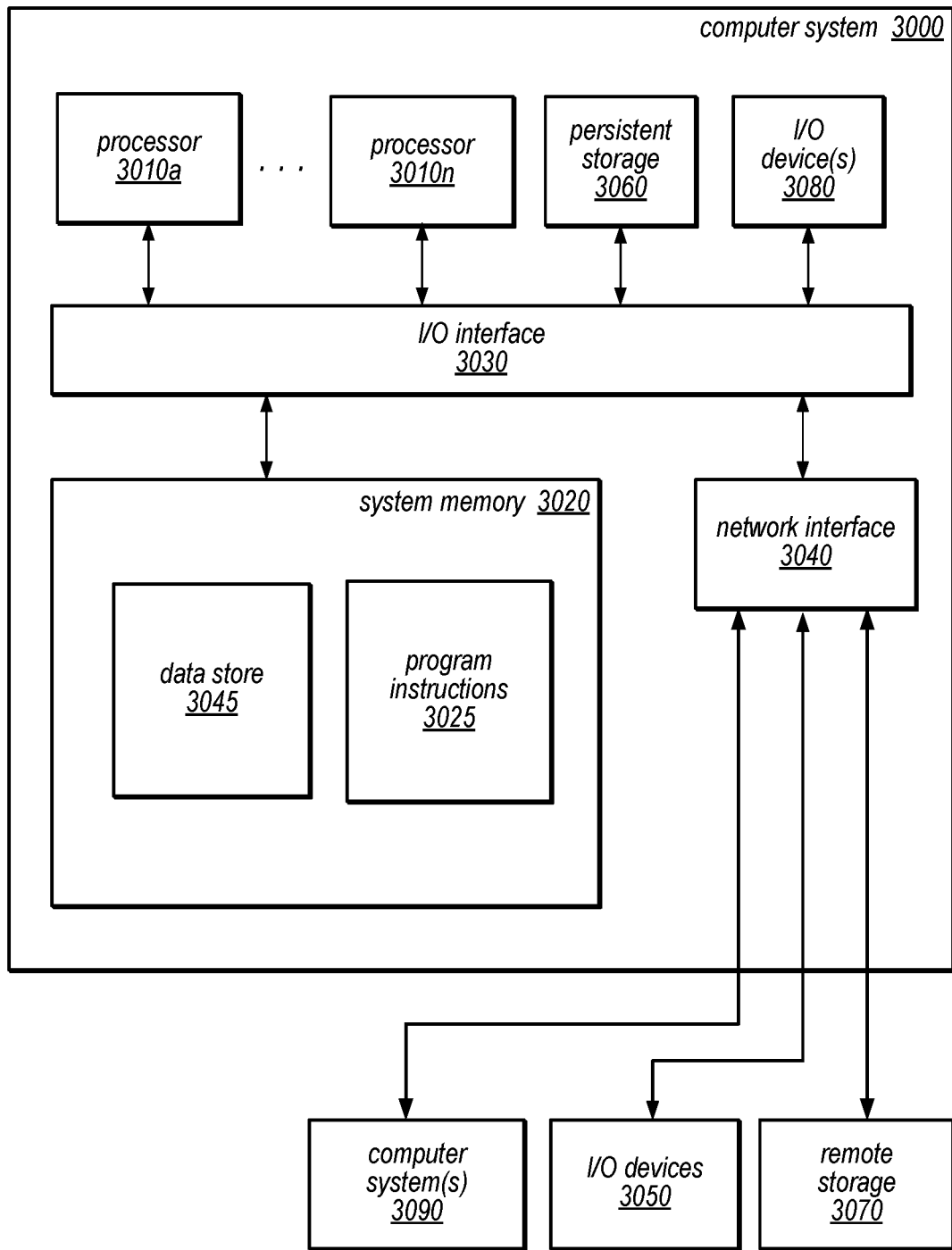
FIG. 12 is a block diagram illustrating an example computer system, according to various embodiments.

FIG. 12 is a block diagram illustrating an example computer system that may implement the various techniques discussed above with regard to FIGS. 1-11, according to various embodiments described herein. For example, computer system 3000 may implement a data processing node, router, and/or a storage node of a separate storage system that stores database tables and associated metadata on behalf of clients of the database tier, in various embodiments. Computer system 3000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 3000 includes one or more processors 3010 (any of which may include multiple cores, which may be single or multi-threaded) coupled to a system memory 3020 via an input/output (I/O) interface 3030. Computer system 3000 further includes a network interface 3040 coupled to I/O interface 3030. In various embodiments, computer system 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. The computer system 3000 also includes one or more network communication devices (e.g., network interface 3040) for communicating with other systems and/or components over a communications network (e.g. Internet, LAN, etc.). For example, a client application executing on system 3000 may use network interface 3040 to communicate with a server application executing on a single server or on a cluster of servers that implement one or more of the components of the database systems described herein. In another example, an instance of a server application executing on computer system 3000 may use network interface 3040 to communicate with other instances of the server application (or another server application) that may be implemented on other computer systems (e.g., computer systems 3090).

In the illustrated embodiment, computer system 3000 also includes one or more persistent storage devices 3060 and/or one or more I/O devices 3080. In various embodiments, persistent storage devices 3060 may correspond to disk drives, tape drives, solid state memory, other mass storage devices, or any other persistent storage device. Computer system 3000 (or a distributed application or operating system operating thereon) may store instructions and/or data in persistent storage devices 3060, as desired, and may retrieve the stored instruction and/or data as needed. For example, in some embodiments, computer system 3000 may host a storage system server node, and persistent storage 3060 may include the SSDs attached to that server node.

Computer system 3000 includes one or more system memories 3020 that may store instructions and data accessible by processor(s) 3010. In various embodiments, system memories 3020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 3020 may contain program instructions 3025 that are executable by processor(s) 3010 to implement the methods and techniques described herein (e.g., various features of fine-grained virtualization resource provisioning for in-place database scaling). In various embodiments, program instructions 3025 may be encoded in native binary, any interpreted language such as Java™ byte-code, or in any other language such as C/C++, Java™, etc., or in any combination thereof. In some embodiments, program instructions 3025 may implement multiple separate clients, server nodes, and/or other components.

In some embodiments, program instructions 3025 may include instructions executable to implement an operating system (not shown), which may be any of various operating systems, such as UNIX, LINUX, Solaris™, MacOS™, Windows™, etc. Any or all of program instructions 3025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 3000 as system memory 3020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 3040.

In some embodiments, system memory 3020 may include data store 3045, which may be configured as described herein. For example, the information described herein as being stored by the database tier (e.g., on a primary node), such as a transaction log, an undo log, cached page data, or other information used in performing the functions of the database tiers described herein may be stored in data store 3045 or in another portion of system memory 3020 on one or more nodes, in persistent storage 3060, and/or on one or more remote storage devices 3070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 3045 or in another portion of system memory 3020 on one or more nodes, in persistent storage 3060, and/or on one or more remote storage devices 3070, at different times and in various embodiments. Similarly, the information described herein as being stored by the storage tier (e.g., redo log records, data pages, data records, and/or other information used in performing the functions of the distributed storage systems described herein) may be stored in data store 3045 or in another portion of system memory 3020 on one or more nodes, in persistent storage 3060, and/or on one or more remote storage devices 3070, at different times and in various embodiments. In general, system memory 3020 (e.g., data store 3045 within system memory 3020), persistent storage 3060, and/or remote storage 3070 may store data blocks, replicas of data blocks, metadata associated with data blocks and/or their state, database configuration information, and/or any other information usable in implementing the methods and techniques described herein.

In one embodiment, I/O interface 3030 may coordinate I/O traffic between processor 3010, system memory 3020 and any peripheral devices in the system, including through network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments, some or all of the functionality of I/O interface 3030, such as an interface to system memory 3020, may be incorporated directly into processor 3010.

Network interface 3040 may allow data to be exchanged between computer system 3000 and other devices attached to a network, such as other computer systems 3090 (which may implement one or more storage system server nodes, primary nodes, read-only node nodes, and/or clients of the database systems described herein), for example. In addition, network interface 3040 may allow communication between computer system 3000 and various I/O devices 3050 and/or remote storage 3070. Input/output devices 3050 may, in some embodiments, include one or more display terminals, keyboards, keypads, touchpads, scanning devices, voice or optical recognition devices, or any other devices suitable for entering or retrieving data by one or more computer systems 3000. Multiple input/output devices 3050 may be present in computer system 3000 or may be distributed on various nodes of a distributed system that includes computer system 3000. In some embodiments, similar input/output devices may be separate from computer system 3000 and may interact with one or more nodes of a distributed system that includes computer system 3000 through a wired or wireless connection, such as over network interface 3040. Network interface 3040 may commonly support one or more wireless networking protocols (e.g., Wi-Fi/IEEE 802.11, or another wireless networking standard). However, in various embodiments, network interface 3040 may support communication via any suitable wired or wireless general data networks, such as other types of Ethernet networks, for example. Additionally, network interface 3040 may support communication via telecommunications/telephony networks such as analog voice networks or digital fiber communications networks, via storage area networks such as Fibre Channel SANs, or via any other suitable type of network and/or protocol. In various embodiments, computer system 3000 may include more, fewer, or different components than those illustrated in FIG. 12 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
 a plurality of computing devices, respectively comprising a processor and a memory, that implement a plurality of database nodes with access to database data;
 wherein a first database node of the plurality of database nodes is configured to:
  perform a write to the database data to obtain a consistency lease, wherein the consistency lease confirms write access to the database data and ensures read-after-write consistency among the plurality of database nodes, wherein the consistency lease describes a point in time determined from a time-to-live (TTL) amount of time added to a consistent state point in time for the database data received in response to the write to the database data, wherein the consistent state point in time is determined based on a time provided a local agent of time synchronization service;
  receive a read request directed to the database data;
  determine a multi-version concurrency control (MVCC) snapshot time for the read request;
  determine that the MVCC snapshot time for the read request is less than the point in time of the consistency lease; and
  responsive to the determination that the MVCC snapshot time for the read request is less than the point in time of the consistency lease:
   perform the read request to the database data according to the multi-version concurrency control snapshot time; and
   return a result based on the performance of the read request.

2. The system of claim 1, wherein the first database node is further configured to:
 receive a different read request directed to the database data;
 determine that a second MVCC snapshot time determined for the different read request is greater than the point in time of the consistency lease;
 block performance of the different read request until an updated consistency lease is obtained with an updated point in time that is greater than the MVCC snapshot time for the different read request.

3. The system of claim 1, wherein a second database node of the plurality database nodes is configured to:
 after a failover from the first database node:
  recover write access to the database data, wherein to recover write access the second database node is configured to:
   obtain a new consistency lease that confirms write access to the database data by the second database node; and
   delay performance of a request received at the second database node until the consistency lease obtained by the first database node is expired.

4. The system of claim 1, wherein the write is received from a client of the first database node.

5. A method, comprising:
 obtaining, by a first data processing node of a plurality of data processing nodes with access to a data set, a consistency lease that confirms write access to the data set, wherein the consistency lease describes a point in time determined from a time-to-live (TTL) amount of time added to a consistent state point in time for the data set determined based on a write to the data set;
 receiving, at the first data processing node, a read request directed to the data set;
 determining, by the first data processing node, that a multi-version concurrency control (MVCC) snapshot time assigned by the first data processing node to the read request is less than the point in time of the consistency lease; and
 responsive to determining that the MVCC snapshot time assigned by the first data processing node to the first read request is less than the point in time of the consistency lease, performing, by the first data processing node, the first read request to the data set according to the multi-version concurrency control snapshot time.

6. The method of claim 5, further comprising:
receiving, at the first data processing node, a different read request directed to the data set;
determining, by the first data processing node, that a second MVCC snapshot time determined for the different read request is greater than the point in time of the consistency lease;
blocking, by the first data processing node, performance of the different read request until an updated consistency lease is obtained by the first data processing node with an updated point in time that is greater than the MVCC snapshot time for the different read request.

7. The method of claim 5, further comprising:
receiving, at the first data processing node, a second read request directed to the data set;
determining, by the first data processing node, that a second MVCC snapshot time determined for the different read request is greater than the point in time of the consistency lease;
returning, by the first data processing node, a failure indication for the different read request after the first data processing node fails to obtain an updated consistency lease with an updated point in time that is greater than the MVCC snapshot time for the different read request.

8. The method of claim 5, further comprising:
after a failover from the first data processing node:
recovering write access to the data set at a second data processing node of the plurality of data processing nodes, comprising:
obtaining a new consistency lease that confirms write access to the data set by the second data processing node; and
delaying performance of a request received at the second data processing node until either the consistency lease obtained by the first data processing node is expired or an acknowledgment that the consistency lease is relinquished from the first data processing node.

9. The method of claim 8, further comprising:
after recovering from the failure, attempting, by the first data processing node, to renew the consistency lease by another write to the data set;
receiving, at the first data processing node, an indication that another data processing node has obtained another consistency lease; and
making the first data processing node a read-only node with read-only access to the data set.

10. The method of claim 5, wherein the consistent state point in time is determined based on a time for the write provided a local agent of time synchronization service.

11. The method of claim 5, wherein the write is received from a client of the data set.

12. The method of claim 5, wherein the write is a heartbeat write that originated at the first data processing node.

13. The method of claim 5, wherein the data set is database data is stored as part of a database service offered by a provider network and wherein the read request is received from a client of the database service.

14. One or more non-transitory, computer-readable storage media, storing program instructions that when executed on or across one or more computing devices cause the one or more computing devices to implement:
performing, by a first database node of a plurality of database nodes with access to database data, a write to the database data to obtain a consistency lease that confirms write access to the database data, wherein the consistency lease describes a point in time determined from a time-to-live (TTL) amount of time added to a consistent state point in time for the database data received in response to the write to the database data;
receiving, at the first database node, a read request directed to the database data;
determining, by the first database node, that a multi-version concurrency control (MVCC) snapshot time assigned by the first database node to the read request is less than the point in time of the consistency lease; and
responsive to determining that the MVCC snapshot time assigned by the first database node to the read request is less than the point in time of the consistency lease:
performing, by the first database node, the read request to the database according to the multi-version concurrency control snapshot time; and
returning, by the first database node, a result based on the performance of the read request.

15. The one or more non-transitory, computer-readable storage media of claim 14, storing further program instructions that when executed on or across the one or more computing devices, cause the one or more computing devices to further implement:
receiving, at the first database node, a different read request directed to the database data;
determining, by the first database node, that a second MVCC snapshot time determined for the different read request is greater than the point in time of the consistency lease;
blocking, by the first database node, performance of the different read request until an updated consistency lease is obtained by the first database node with an updated point in time that is greater than the MVCC snapshot time for the different read request.

16. The one or more non-transitory, computer-readable storage media of claim 14, storing further program instructions that when executed on or across the one or more computing devices, cause the one or more computing devices to further implement:
receiving, at the first database node, a different read request directed to the database data;
determining, by the first database node, that a second MVCC snapshot time determined for the different read request is greater than the point in time of the consistency lease;
returning, by the first database node, a failure indication for the different read request after the first database node fails to obtain an updated consistency lease with an updated point in time that is greater than the MVCC snapshot time for the different read request.

17. The one or more non-transitory, computer-readable storage media of claim 14, storing further program instructions that when executed on or across the one or more computing devices, cause the one or more computing devices to further implement:
after a failover from the first database node:
recovering write access to the database data at a second database node of the plurality of database nodes, comprising:
obtaining a new consistency lease that confirms write access to the database data by the second database node; and delaying performance of a request received at the second database node until the consistency lease obtained by the first database node is expired.

18. The one or more non-transitory, computer-readable storage media of claim 14, wherein the MVCC snapshot time is assigned to the first read request based on a time obtained from an agent of a time synchronization service at the first database node.

19. The one or more non-transitory, computer-readable storage media of claim 14, wherein the write is received from a client.

20. The one or more non-transitory, computer-readable storage media of claim 14, wherein the database data is stored as part of a database service offered by a provider network and wherein the first read request is received from a router of the database service, and wherein the first read request is directed to one table shard volume of a system-managed table of the database.

* * * * *